(12) United States Patent
Dubosc

(10) Patent No.: US 12,043,365 B2
(45) Date of Patent: Jul. 23, 2024

(54) AIRCRAFT DOOR WITH DEVICE FOR HOLDING THE HANDLING ARMS

(71) Applicant: LATECOERE, Toulouse Occitaine (FR)

(72) Inventor: Gregory Dubosc, Girolles Occitanie (FR)

(73) Assignee: LATECOERE, Toulouse Occitanie (FR)

(*) Notice: Subject to any disclaimer, the term of this patent is extended or adjusted under 35 U.S.C. 154(b) by 25 days.

(21) Appl. No.: 17/618,999

(22) PCT Filed: Jun. 12, 2020

(86) PCT No.: PCT/EP2020/025274
§ 371 (c)(1),
(2) Date: Dec. 14, 2021

(87) PCT Pub. No.: WO2020/253985
PCT Pub. Date: Dec. 24, 2020

(65) Prior Publication Data
US 2022/0363364 A1 Nov. 17, 2022

(30) Foreign Application Priority Data
Jun. 15, 2019 (FR) ........................................ 1906437

(51) Int. Cl.
*B64C 1/14* (2006.01)

(52) U.S. Cl.
CPC .................................. *B64C 1/1423* (2013.01)

(58) Field of Classification Search
CPC .............................. B64C 1/1423; B64C 1/143
See application file for complete search history.

(56) References Cited

U.S. PATENT DOCUMENTS

| | | | | |
|---|---|---|---|---|
| 2,751,636 A * | 6/1956 | James | ................... | B64C 1/1407 16/370 |
| 3,051,280 A * | 8/1962 | Wood | .................... | B64C 1/1407 16/302 |
| 4,199,120 A | 4/1980 | Bergman | | |
| 2020/0070946 A1 * | 3/2020 | Risch | ...................... | E05D 11/10 |

FOREIGN PATENT DOCUMENTS

| | | |
|---|---|---|
| DE | 102004036184 | 2/2006 |
| EP | 1227034 | 7/2002 |

* cited by examiner

*Primary Examiner* — Christopher D Hutchens
(74) *Attorney, Agent, or Firm* — Defillo & Associates, Inc.; Evelyn A. Defillo

(57) ABSTRACT

An aircraft door having: a first handling arm and a first forearm; a second handling arm and a second forearm; a holding device movable between: an immobilising position in which the first forearm and the second forearm are immobilised relative to the door panel; and a released position in which the first forearm and the second forearm are free to pivot relative to the door panel in at least one direction of rotation.

10 Claims, 10 Drawing Sheets

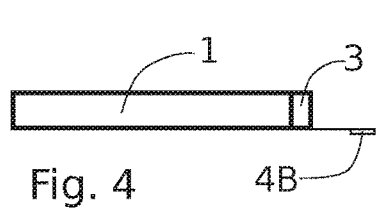
Fig. 4
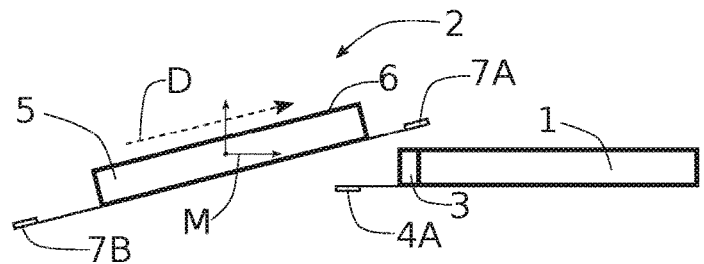
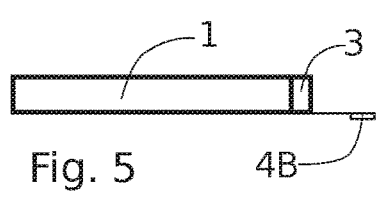
Fig. 5
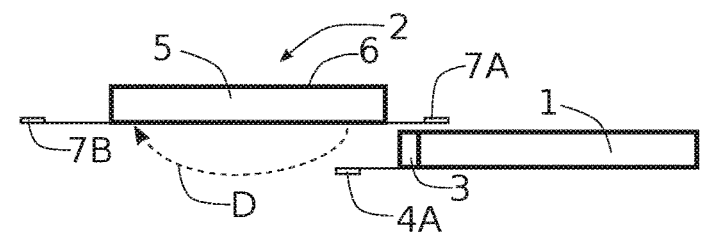
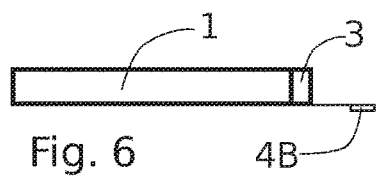
Fig. 6
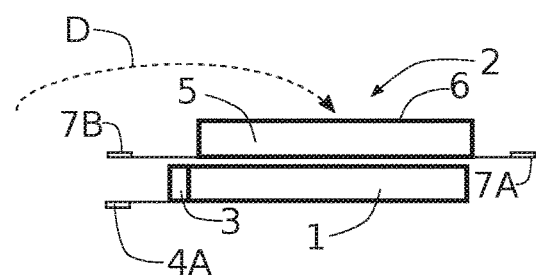

AIRCRAFT DOOR WITH DEVICE FOR HOLDING THE HANDLING ARMS

CROSS REFERENCE TO RELATED APPLICATION

This application is a national stage entry of PCT/EP2020/025274 filed Jun. 12, 2020, under the International Convention and claiming priority over French Patent Application No. FR1906437 filed Jun. 15, 2019.

TECHNICAL FIELD

The invention relates to the field of aeronautics and relates more particularly to aircraft doors and their opening and closing mechanisms.

An aircraft generally has several openings in its fuselage, to allow access to the cabin or to the holds. These openings are fitted with doors, the locking/unlocking mechanism of which must ensure the solidity of the locking and the tightness of this door during flight. In addition, opening must be simple and quick to perform by flight personnel from inside the aircraft, or by rescue teams from outside. Resistance to the pressure difference between the interior of the cabin and the exterior of the aircraft is achieved by means of stops installed on the peripheries of the leaf of the door and its frame.

PRIOR ART

Known aircraft doors generally comprise: a leaf; a surround comprising a door frame intended to be fixed to the fuselage of the aircraft; a door locking/unlocking mechanism adapted to move the leaf relative to the door frame.

Different opening and closing systems exist for aircraft doors.

A first type of system consists, in opening, first of all in raising or lowering the door, vertically, to release the door stops from the frame stops, then in applying a circular translational movement to it to release it from its frame parallel to the latter.

Another type of system consists first of all in carrying out a first pivoting about a first virtual axis passing through the vertical median of the door then, in a second step, the door is pivoted about hinges placed along an axis coinciding with a vertical edge of the frame, which results in a final door position with its internal part facing outward.

Patent application EP1227034 describes an aircraft door comprising handling arms as well as a device for holding these handling arms.

DISCLOSURE OF THE INVENTION

The object of the invention is to improve the aircraft doors of the prior art and in particular their opening and closing means.

To this end, the invention is aimed at an aircraft door comprising:
  a leaf;
  a surround comprising a door frame intended to be fixed to the fuselage of the aircraft;
  a door locking/unlocking mechanism adapted to move the leaf relative to the door frame.
This aircraft door comprises:
  a first handling arm and a first forearm interconnected by a pivot connection, the first handling arm being connected to the door frame by a pivot connection and the first forearm being connected to the leaf by a pivot connection;
  a second handling arm and a second forearm interconnected by a pivot connection, the second handling arm being connected to the door frame by a pivot connection and the second forearm being connected to the leaf by a pivot connection;
  a holding device, movable between: a locking position in which the first forearm and the second forearm are immobilized relative to the leaf; and an unlocking position in which the first forearm and the second forearm are free to pivot relative to the leaf in at least one direction of rotation.

Such an aircraft door benefits from the possibility of a relative movement between the leaf and the door frame which is only produced by pivot connections. Such mechanical connections are simple, reliable and inexpensive to implement. This relative movement of the leaf relative to the door frame is advantageously used to lock and unlock the door. Locking and unlocking of the door is thus obtained without resorting to complex mechanisms, common in the prior art, which comprise slideways or devices for raising and lowering the leaf.

The door thus allows complex relative movements between the leaf and the door frame when the holding device is in the unlocking position. The door can also be configured to benefit from an additional range of use in which the holding mechanism is in the locking position so that a deformable quadrilateral connection is formed between the leaf and the door frame. The leaf can for example be moved in circular translation relative to the door frame during this additional range of use.

According to a preferred implementation, the door thus comprises a first configuration in which a relative movement between the leaf and the door frame makes it possible to lock or unlock the door; and a second configuration in which the door can be opened or closed manually by moving the leaf in circular translation relative to the fuselage of the aircraft.

The mechanisms allowing the movement of the leaf and the locking/unlocking of the door are thus only based on pivot connections with the advantages in saving weight, reducing cost and improving reliability associated therewith, by exploiting the pivots in a modular manner.

According to another object, the invention is aimed at a method for opening an aircraft door as described above. This method comprises:
  a first unlocking phase in which the holding device is in the unlocking position;
  a second opening phase in which the holding device is in the locking position.

According to a preferred feature, between the unlocking phase and the opening phase, the leaf passes through a predetermined position in which the holding device passes into the locking position by the return, facing a stop surface secured to the first forearm, of a movable stop secured to the leaf and actuated by a guide fitting secured to the first handling arm.

The aircraft door may have the following additional features, alone or in combination:
  the holding device comprises a first stop and a second stop adapted to immobilize the rotation of the first forearm and of the second forearm relative to the leaf in one direction of rotation;
  the holding device comprises a third stop adapted to prevent the two forearms from coming together;

the holding device comprises a stop movable between: an activated position in which the movable stop locks the position relative to the leaf of one of the forearms against at least one of said stops; and a deactivated position in which the movable stop is outside the radius of action of the forearm;

the door has a predetermined position in which the first stop is arranged between the leaf and the first forearm, the second stop is arranged between the leaf and the second forearm, the third stop is arranged between the first forearm and the second forearm, and the movable stop is in the activated position and arranged between the leaf and the first forearm;

the movable stop is activated and deactivated by a guide fitting arranged on the first handling arm so that, when the door is in said predetermined position, the movable stop: is activated by a mutual rotation in one direction of rotation of the first handling arm relative to the first forearm; is deactivated by a mutual rotation in the other direction of rotation of the first handling arm relative to the first forearm;

the movable stop is rotatably mounted on a base secured to the leaf and comprises a first arm provided with a first contact element and a second arm provided with a second contact element, the second contact element being arranged away from a stop surface secured to the first forearm when the first contact element is moved by the guide fitting;

the movable stop comprises an elastic return element urging the movable stop toward a rest position against the base;

the locking/unlocking mechanism comprises means causing a relative movement of the first handling arm and of the leaf;

the locking/unlocking mechanism comprises a guide track and an actuating finger, one of which is secured to the first handling arm and the other of which is secured to the leaf, the path of the actuating finger in the guide track causing a relative movement of the first handling arm and of the leaf;

the door is movable between: a locking/unlocking configuration in which the holding device is in the unlocking position and the actuating finger is captive to the guide track; an opening configuration in which the holding device is in the locking position and the actuating finger is released from the guide track;

the door comprises door stops and frame stops adapted to laterally lock the leaf on the door frame, the door being adapted to locking and unlocking by lateral movements of the leaf relative to the door frame.

DESCRIPTION OF THE FIGURES

Other features and advantages of the invention will emerge from the nonlimiting description which follows, with reference to the appended drawings in which:

FIG. 4 illustrates a third step of a sequence for opening the door of FIG. 1;

FIG. 5 illustrates a fourth step of a sequence for opening the door of FIG. 1;

FIG. 6 illustrates a fifth step of a sequence for opening the door of FIG. 1;

DETAILED DESCRIPTION OF THE INVENTION

FIGS. 1 to 6 are schematic figures illustrating the movement of an aircraft door according to the invention. This aircraft door has a so-called "lateral escape" operation, which means that the door unlocks thanks to lateral movements of the leaf allowing the release of the door stops relative to the frame stops. These lateral movements are here defined as movements in a longitudinal direction X parallel to the longitudinal axis of the aircraft.

FIGS. 1 to 6 schematically illustrate the operations allowing the opening of the aircraft door. The closing of this aircraft door takes place by the same operations carried out in the reverse order.

Figure 1:
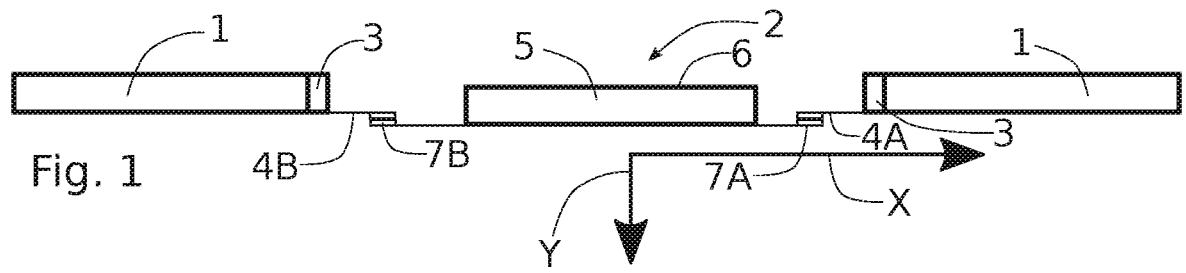
FIG. 1 illustrates an aircraft door according to the invention, in the closed position.

FIG. 1 schematically shows a portion of the fuselage 1 of an aircraft as well as a door 2. The door 2 comprises a surround consisting here of a door frame 3 which is fixed to the fuselage 1 and which is provided with frame stops 4. The door 2 also comprises a leaf 5 which is provided with an external wall 6 facing the exterior of the aircraft, as well as door stops 7.

In this schematic view of FIG. 1, the fuselage portion 1 and the door 2 are seen from above, in section along a horizontal plane. The arrow X in FIG. 1 illustrates the longitudinal axis of the aircraft, and points toward the front of the aircraft. The arrow Y illustrates the transverse axis of the aircraft and is pointed toward the interior of the aircraft. The frame stops thus comprise front frame stops 4A and rear frame stops 4B. Likewise, the door stops comprise front door stops 7A and rear door stops 7B.

In the position of FIG. 1, the door 2 is in the closed position, the leaf 5 closing the door frame 3, this closure being locked by the door stops 7 acting against the frame stops 4, by a flat-on-flat contact. This locked position allows the flight of the aircraft.

From this closed position of FIG. 1, the method for opening the door 2 is illustrated with reference to FIGS. 2 to 6. In these figures, the movement of the leaf is indicated by the arrows D and the components of the action which is transmitted to the leaf 5 by the locking/unlocking mechanism, and which allows the movement D, is indicated by the reference M.

Figure 2:
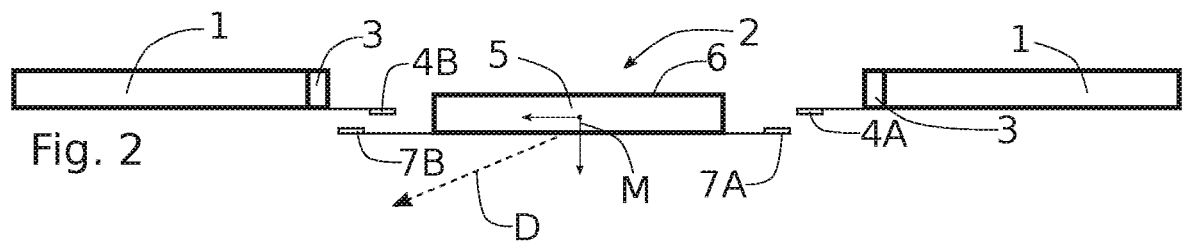
FIG. 2 illustrates a first step of a sequence for opening the door of FIG. 1.

A first movement, illustrated in FIG. 2 and controlled by the locking/unlocking mechanism, drives the leaf 5 toward the interior of the aircraft and toward the rear. The door stops 7 are thus located away from the frame stops 4 in the transverse direction Y. In addition, the front door stops 7A are released from the front frame stops 4A, that is to say that the front door stops 7A are no longer opposite the front frame stops 4A, the front frame stops 4A therefore no longer preventing the front door stops 7A from moving toward the exterior of the aircraft. This movement D of the leaf is possible thanks to forces transmitted to the leaf by the locking/unlocking mechanism in the two directions M.

Figure 3:
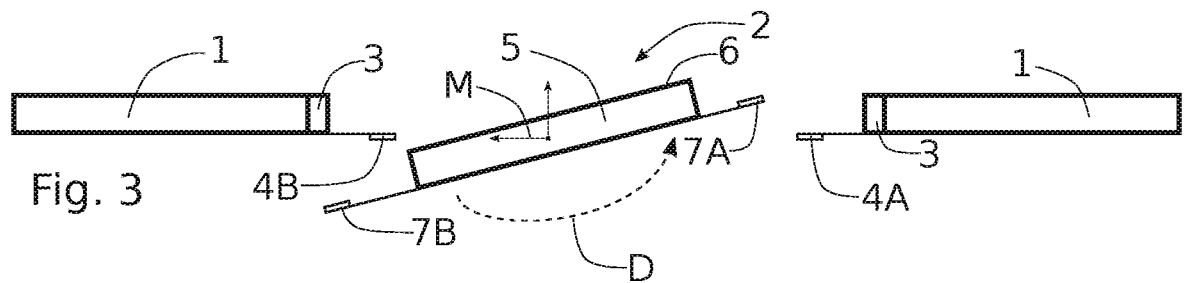
FIG. 3 illustrates a second step of a sequence for opening the door of FIG. 1.

Following a second movement D illustrated in FIG. 3, the leaf 5 is pivoted about a vertical axis so that the front door stops 7A are moved toward the exterior of the aircraft, beyond the level of the front frame stops 4A. This rotational movement D of the leaf is possible thanks to forces transmitted to the leaf by the locking/unlocking mechanism in the two directions M.

Following a third movement D illustrated in FIG. 4, the leaf 5 is then translated forward in its own plane, that is to say that the leaf 5 undergoes a translation along a direction extending between a rear stop 7B and a front stop 7A. This movement D then makes it possible to release the rear door stops 7B relative to the rear frame stops 4B. The door stops 7B are no longer opposite the frame stops 4B and the movement of the leaf 5 toward the exterior of the aircraft is no longer hampered by any stop. This rotational movement D of the leaf is possible thanks to forces transmitted to the leaf by the locking/unlocking mechanism in the two directions M.

In a fourth movement D illustrated in FIG. 5, the leaf 5 undergoes a rotation about a vertical axis so that it finds an orientation parallel to the fuselage 1. This rotational movement here does not require any transmission of forces from the locking/unlocking mechanism, since it does not require movement of the door support arm. This rotational movement can be achieved by a device allowing the orientation of the door, such as a pivot arm described below.

During a last opening movement D, illustrated in FIG. 6, the leaf 5 is driven in a circular translation which positions the leaf 5 against the fuselage 1, keeping the leaf 5 parallel to the fuselage 1 and completely releasing the frame 3 to allow access to the aircraft. In the position of FIG. 6, the aircraft door is in the open position.

The method for closing the door 2 takes place in the opposite direction from the position of FIG. 6 to the position of FIG. 1.

The opening and closing of the door 2 as well as the corresponding locking and unlocking operations of the stops 4, 7 are carried out only with operations of: lateral translations of the leaf 5 (along the X axis); transverse translations (along the Y axis) of the leaf 5; and rotations of the leaf 5 about a vertical axis. The leaf 5 is movable only in a horizontal plane, the leaf 5 being fixed in the vertical direction.

Figure 7:
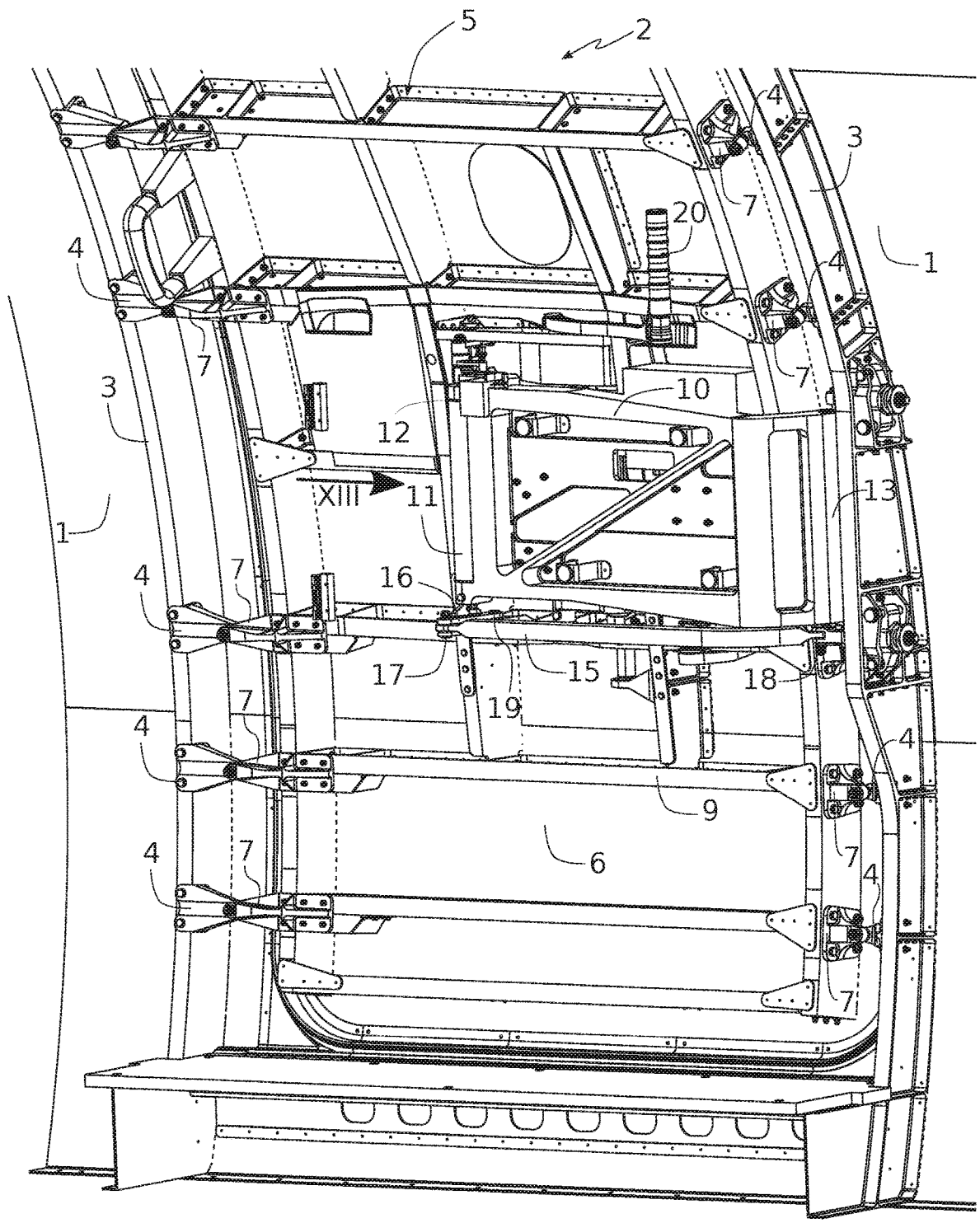
FIG. 7 is a general view of an aircraft door according to the invention.

FIG. 7 shows the aircraft door 2 in the closed position (position of FIG. 1) and seen from the interior of the aircraft.

The door frame 3 is shown fixed to the fuselage 1, the frame stops 4 being bolted to two lateral uprights of the door frame 3.

The leaf 5 comprises a door structure 9 generally composed of beams and longitudinal members. The external wall 6 of the leaf 5 is fixed to the door structure 9. The door stops 7 are also bolted to the door structure 9.

The means allowing the door 2 to perform the movements described in FIGS. 1 to 6 here only consist of arms and pivot connections. The door 2 thus comprises a first handling arm 10 and a first forearm 11 interconnected by a pivot connection 12. The first handling arm 10 here consists of a supporting structure made of a single piece or of beams assembled to support the weight of the leaf 5. The first handling arm 10 is mounted on the door frame 3 by a pivot connection 13. The first forearm 11, which is only partially visible in this FIG. 7, is also connected to the leaf 5 by a pivot connection 14 (not visible in FIG. 7 but visible in particular in FIGS. 8 to 11).

The door 2 also comprises a second handling arm 15 and a second forearm 16 which are interconnected by a pivot connection 17. The second handling arm 15 is connected to the door frame 3 by a pivot connection 18. The second forearm 16 is connected to the leaf 5 by a pivot connection 19.

The pivot connections 12, 13, 14, 17, 18, 19 can be produced by any suitable means such as (rolling) bearings, antifriction rings, etc.

The first handling arm 10 and the first forearm 11 have a larger dimension than the second handling arm 15 and the second forearm 16 because the first handling arm 10 and the first handling forearm 11 are, in this example, designed to support the entire weight of the leaf 5. Regardless of their dimensioning, the first handling arm 10, the first forearm 11, the second handling arm 15 and the second forearm 16 fulfill a geometric function of articulating the leaf 5 allowing the locking and unlocking and opening and closing maneuvers.

The door 2 also comprises a lever 20 making it possible to actuate a locking/unlocking device which drives the leaf 5 in movement between its positions of FIGS. 1 to 5.

FIGS. 8 to 11 are schematic views illustrating the behavior of the geometric arrangement produced by the handling arms 10, 15 and their respective forearms 11, 16. In these figures, the door is schematically viewed from above. FIGS. 8 to 11 are schematic views simply illustrating the arrangement of the components between them and do not define any particular kinematics.

Figure 8:
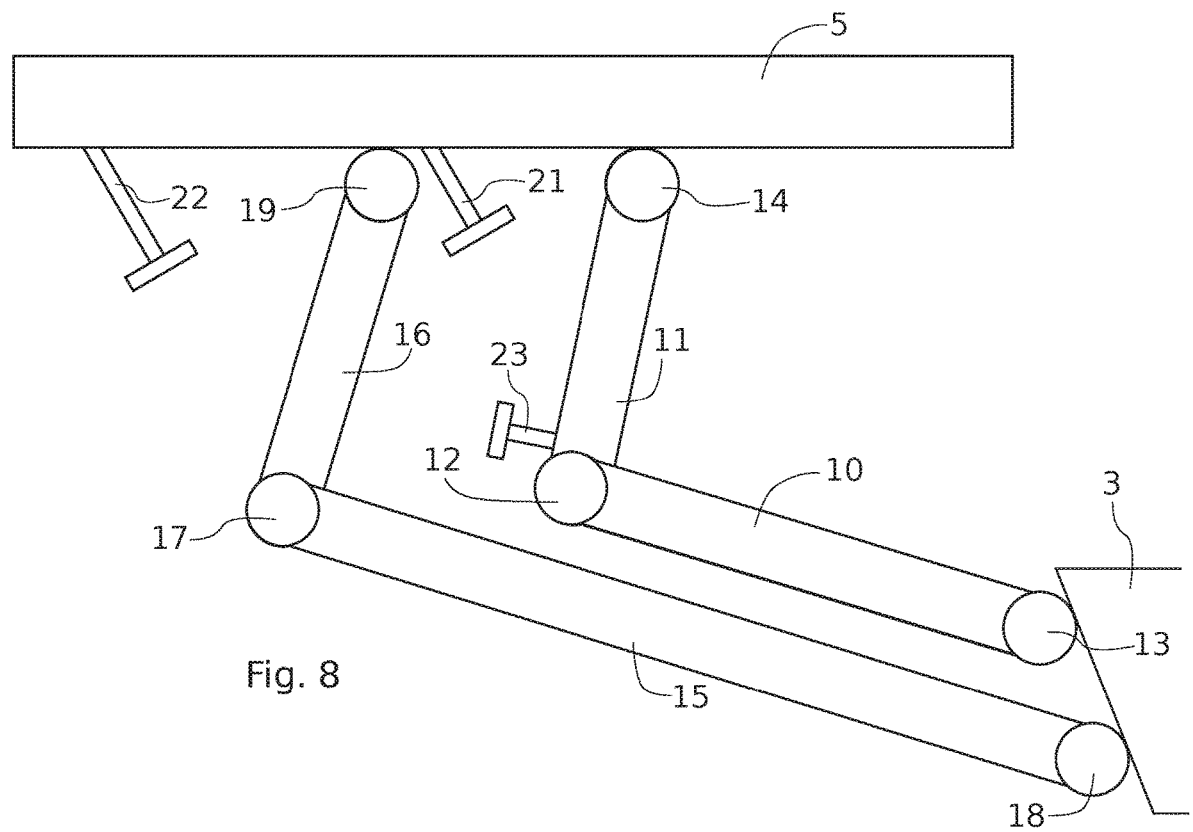
FIG. 8 is a schematic view illustrating the operation of the door according to the invention, in a first position.

In FIG. 8, the leaf 5 is movable relative to the door frame 3 according to the degrees of freedom authorized by the arms 10, 15 and their respective forearms 11, 16 and their respective pivot connections 12, 13, 14, 17, 18, 19. This assembly allows great freedom of movement because the two pivot connections 12, 17 which connect each of the arms 10, 15 to its forearm 11, 16 are not anchored to any fixed part and can therefore be moved, in addition to ensuring their pivot function. Each of the arms 10, 15 can therefore pivot about its connection 13, 18 with the door frame 3, at different angles, while the forearms 11, 16 can themselves pivot about the corresponding arm 10, 15.

A wide variety of relative positions and mutual orientations can thus be obtained for the leaf 5 with respect to the door frame 3. Although the freedom of movement of the leaf 5 is not absolute because it is limited to the combination of possible rotations linked to the position of the pivots and to the dimensions of the arms and forearms, this freedom of movement is sufficient in particular to carry out the movements of locking and unlocking by lateral escape, described as an example in FIGS. 1 to 5.

The door 2 further comprises a holding device consisting here of stops adapted to cooperate with the arms 10, 15 and the forearms 11, 16. First of all, the holding device comprises three fixed stops:

a first stop 21 fixed to the leaf 5 and arranged opposite the first forearm 11;

a second stop 22 fixed to the leaf 5 and arranged opposite the second forearm 16;

a third stop 23 fixed to the first forearm 11 and facing the second forearm 16.

This holding device is designed to immobilize the two forearms 11, 16 relative to the leaf 5 in a predetermined position. The stops 21, 22, 23 are dimensioned in shape and positioning to come into contact with the arms and forearms in this predetermined position.

Figure 9:
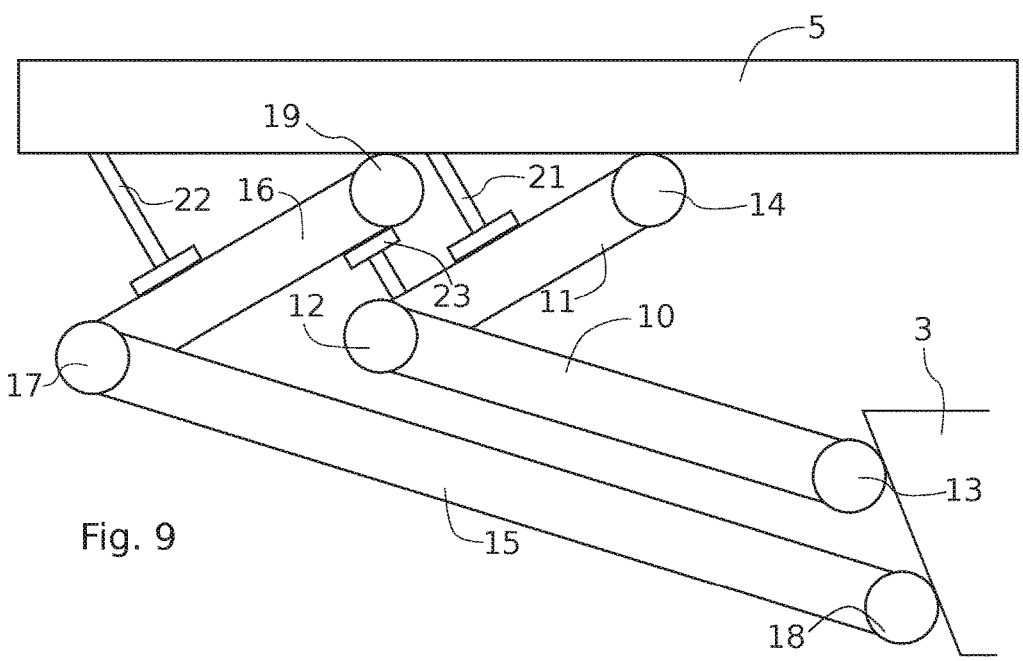
FIG. 9 is a schematic view illustrating the operation of the door according to the invention, in a second position.

FIG. 9 illustrates this predetermined position of action of the holding device. The predetermined position illustrated in FIG. 9 is chosen randomly for the purposes of the disclosure. In this predetermined position of FIG. 9, at this precise position of the leaf 5 relative to the door frame 3, the angle formed by the arms 10, 15 and the forearms 11, 16 between them and with the leaf 5 brings the first forearm 11 to come against the first stop 21, the second forearm 16 to come against the second stop 22, and the third stop 23 to come against the second forearm 16.

Figure 10:
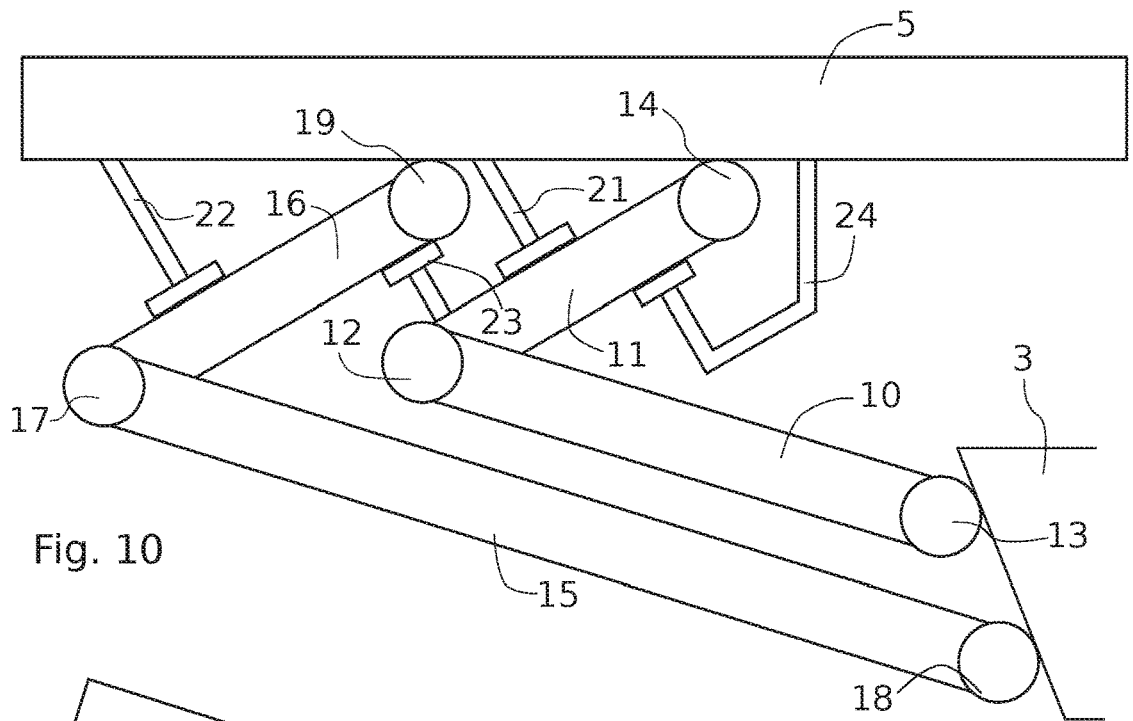
FIG. 10 is a schematic view illustrating the operation of the door according to the invention, in a third position.

With reference to FIG. 10, the holding device further comprises a fourth stop 24 which is movable. The movable stop 24 can be deactivated, that is to say retracted, (this is the case in FIG. 9) or activated (this is the case in FIG. 10) by any mechanical or electrical means (not shown in these schematic FIGS. 9, 10).

The activation of the movable stop 24 makes this stop fixed with respect to the leaf 5, the movable stop 24 coming into abutment against the first forearm 11.

The holding device, with its movable stop 24 activated, is thus in the locking position (position of FIG. 10) as opposed to its unlocking position in which the movable stop 24 is not activated (FIG. 8).

In the locking position, the first forearm 11 is locked between the movable stop 24 and the first stop 21 and the second forearm 16 is locked between the second stop 22 and the third stop 23. The two forearms 11, 16 are thus immobilized relative to the leaf 5. The leaf 5 and the forearms 11, 16 then function as an integral assembly which is only articulated by the pivots 12 and 17.

Figure 11:
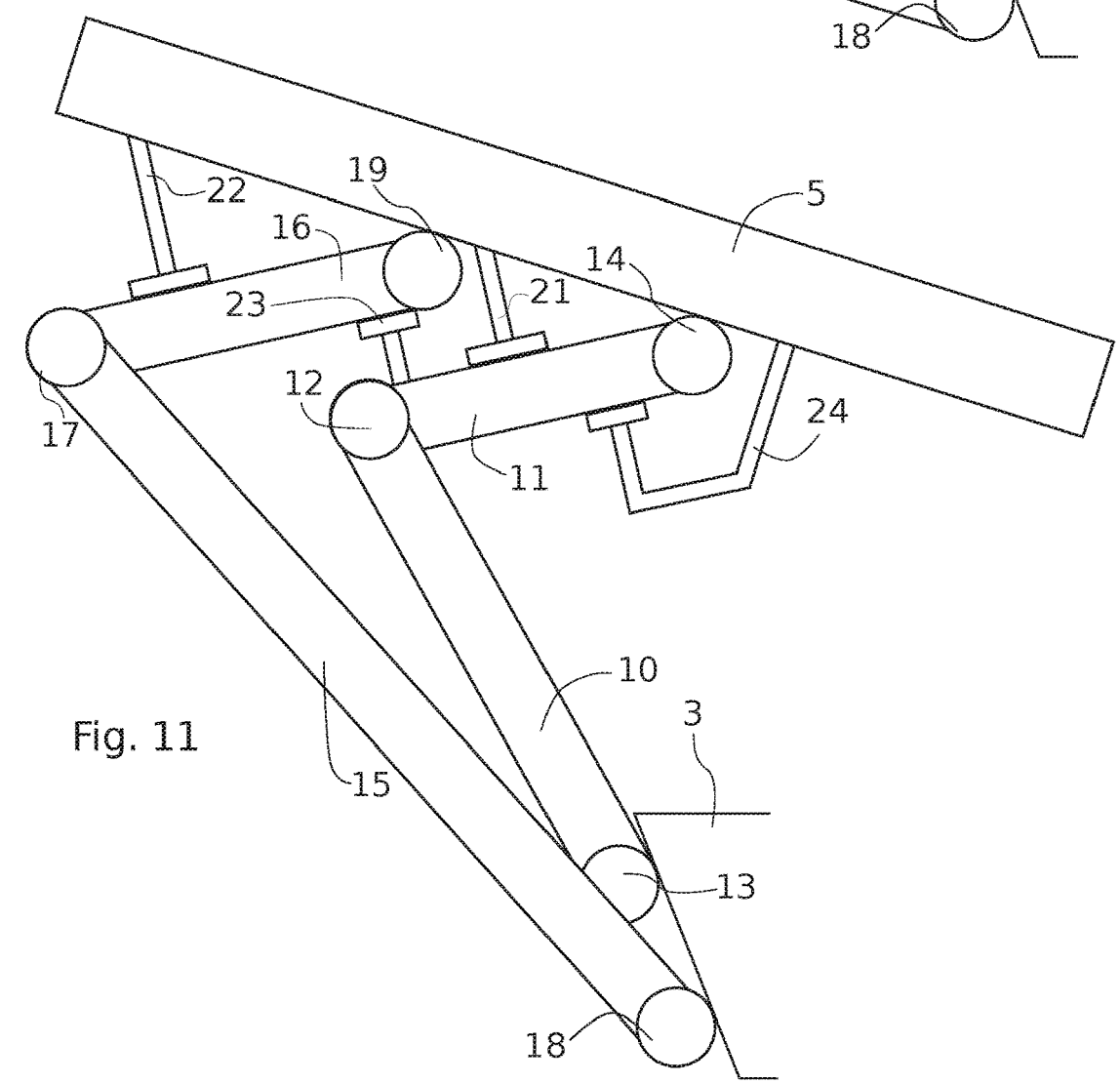
FIG. 11 is a schematic view illustrating the operation of the door according to the invention, in a fourth position.

With reference to FIG. 11, the one-piece assembly formed by the leaf 5 and the forearms 11, 16 is therefore, in the locking position of the holding device, articulated in a conventional manner on the door frame 3 by a deformable quadrilateral made up of the four pivot connections 13, 18, 12, 17.

The length of the arms 10, 15 and the position of the pivots is chosen as a function of the desired movement for the leaf 5 relative to the door frame 3. In particular, in this locking position of the holding device, the choice is made for a circular translational movement allowing, in the present example, the leaf 5 to pass from its unlocked position of FIG. 5 to its open position of FIG. 6.

In a particularly advantageous embodiment and in the case of the example of unlocking by lateral escape described in FIGS. 1 to 6, the holding device is, according to a locking/unlocking phase, in the unlocking position during all the illustrated positions of FIG. 1 to FIG. 5, which allows the leaf 5 the various rotations and translations allowing its unlocking. From the unlocking position of FIG. 5, the holding device passes into locking mode and the leaf 5 can then be driven, generally manually, to perform the circular translational movement leading it to the open position of FIG. 6, according to an opening phase.

Figure 12:
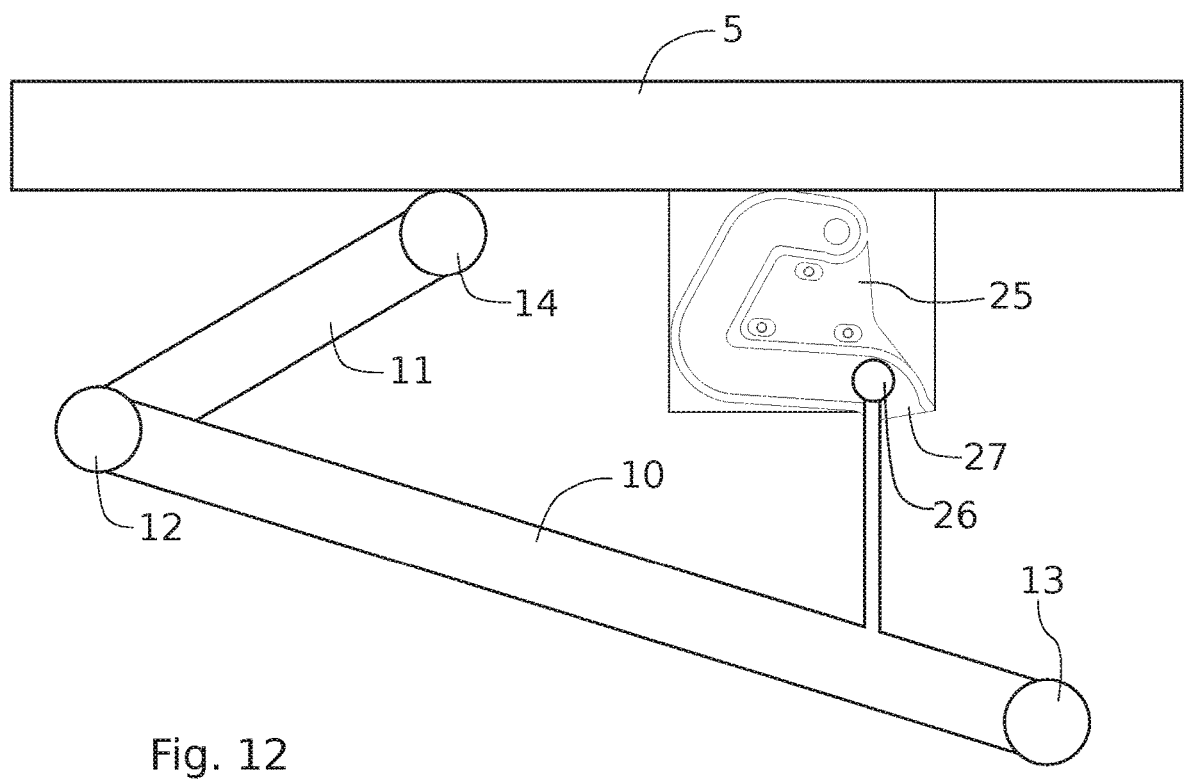
FIG. 12 is a schematic illustration of the locking/unlocking device of a door according to the invention.

To allow the movements of the leaf 5 during the locking/unlocking phase, the locking/unlocking mechanism preferably comprises means causing a relative movement of the first handling arm 10 and of the leaf 5. FIG. 12 is a schematic view showing these means coupled to the first arm 10.

With reference to FIG. 10, the locking/unlocking mechanism comprises a guide track 25 and an actuating finger 26 (for example, a roller) adapted to travel over this guide track 25. The actuating finger 26 is secured to the arm 10 and the guide track 25 is secured to the leaf 5, or vice versa, so that the path of the actuating finger 26 along the guide track 25 causes the desired mutual movements between the leaf 5 and the arm 10. The leaf 5 is thus driven in its unlocking movement by the lateral escape movements described as an example in FIGS. 1 to 5.

The guide track 25 has an opening 27 through which the actuating finger 26 is free to leave the guide track 25 from the unlocked position of FIG. 5.

The door is therefore adapted to have:

a locking/unlocking configuration in which the holding device is in the unlocking position and the actuating finger 26 is captive to the guide track so that the driving of the actuating finger 26 to travel over the guide track 25 causes the leaf 5 to perform the movements necessary for its locking or its unlocking;

an opening configuration in which the holding device is in the locking position and the actuating finger 26 has left the guide track 25 through the opening 27, so that the leaf 5 is no longer driven in movement by the actuating finger 26 and can then in particular be moved manually by a deformable quadrilateral articulation as described above (movement shown in FIG. 6).

The path of the actuating finger 26 in the guide track 25 can be driven by any means such as, for example, a rotary fork.

Figure 13:
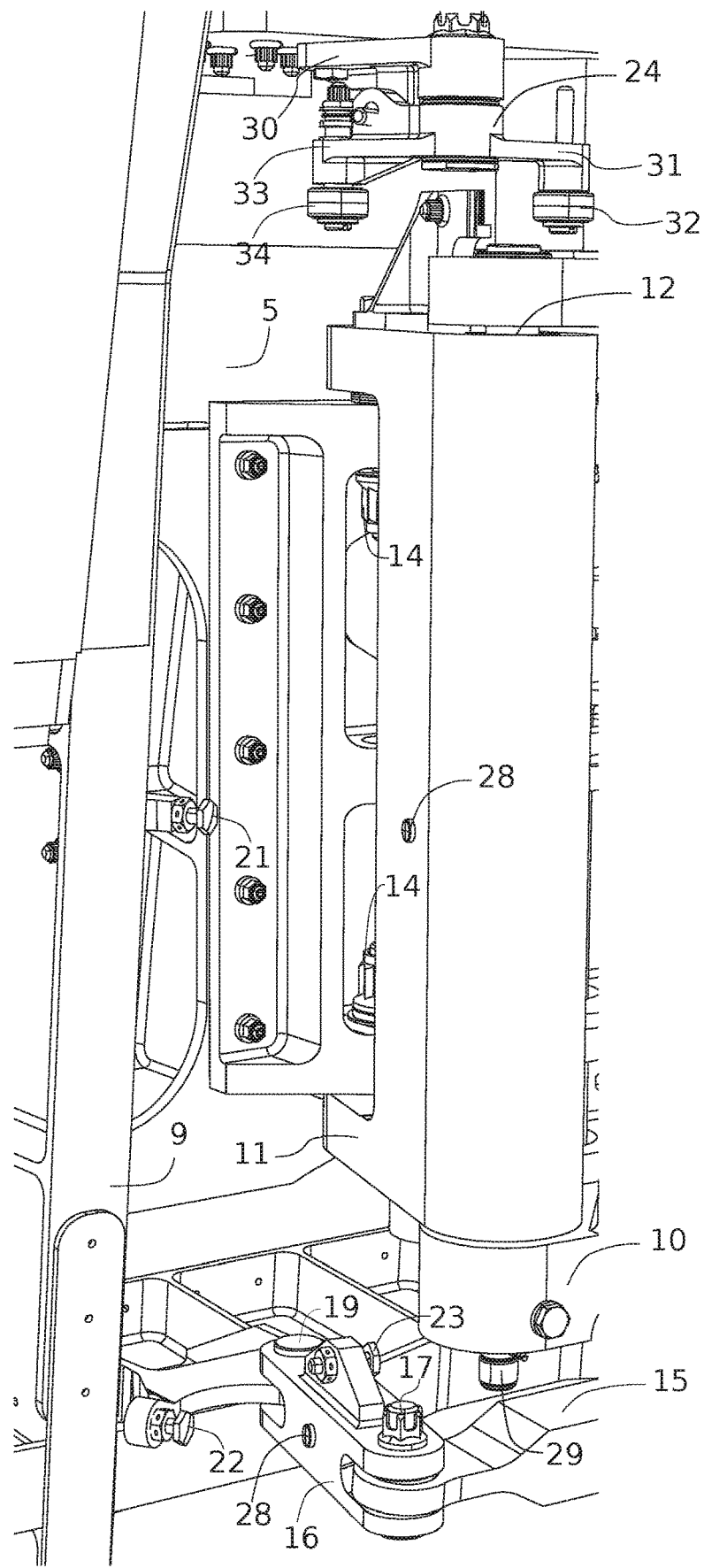
FIG. 13 is a detail view of FIG. 7.

FIGS. 13 to 19 illustrate an embodiment of the positioning of the four stops 21, 22, 23, 24 of the holding device in the example of the door shown in FIG. 7. FIG. 13 is an enlarged perspective view of the area designated by arrow XIII of FIG. 7. In this FIG. 13, the end of the first handling arm 10 is visible, at the level of the pivot 12, as well as the first forearm 11 and its pivot 14 connecting it to the leaf 5.

Under the first handling arm 10, the end of the second handling arm 15 is visible as well as the second forearm 16 and their mutual pivot 17. The pivot connection 19 connecting the second forearm 16 to the leaf 5 is also visible.

The first stop 21 is here arranged on the leaf 5 opposite the first forearm 11. The second stop 22 is also arranged on the leaf 5 opposite the second forearm 16. The third stop 23 is arranged on a support mounted on the second forearm 16 and facing the first forearm 11.

Each of the stops 21, 22, 23 here consists of a screw making it possible to refine the adjustment of its position. The first stop 21 and the second stop 22 are designed to cooperate with an elastic pad 28 making it possible to damp the impact of the stop 21, 22 against the corresponding part. The positions of a stop and of its corresponding pad can be reversed.

The third stop 23 is provided to cooperate against a buffer 29 rotating in the same axis as the pivot connection 12. With the buffer 29 being situated on the pivot connection 12, this position corresponds to the end of the first forearm 11. The third stop 23, coming against the buffer 29, thus immobilizes the coming together of the first forearm 11 and the second forearm 16.

In FIG. 13, the movable stop 24 is visible on top of the first forearm 11. The movable stop 24 is rotatably mounted on a base secured to the leaf 5.

Figure 14:
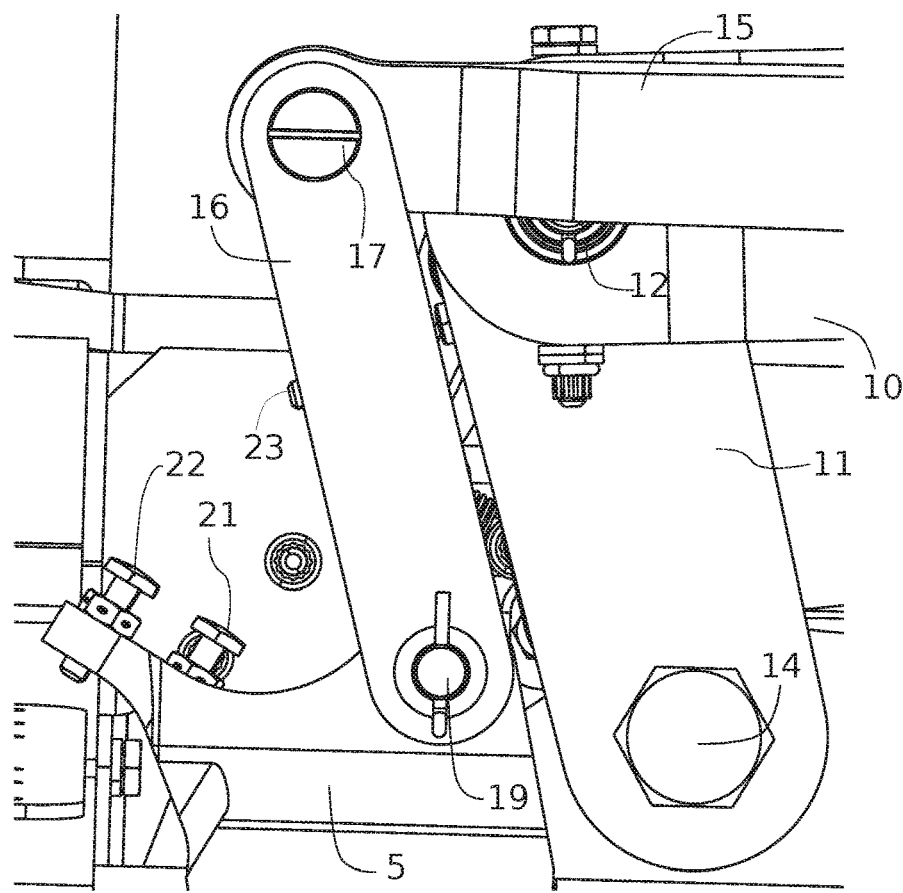
FIG. 14 is a bottom view of the elements of FIG. 13, in a first position.
Figure 15:
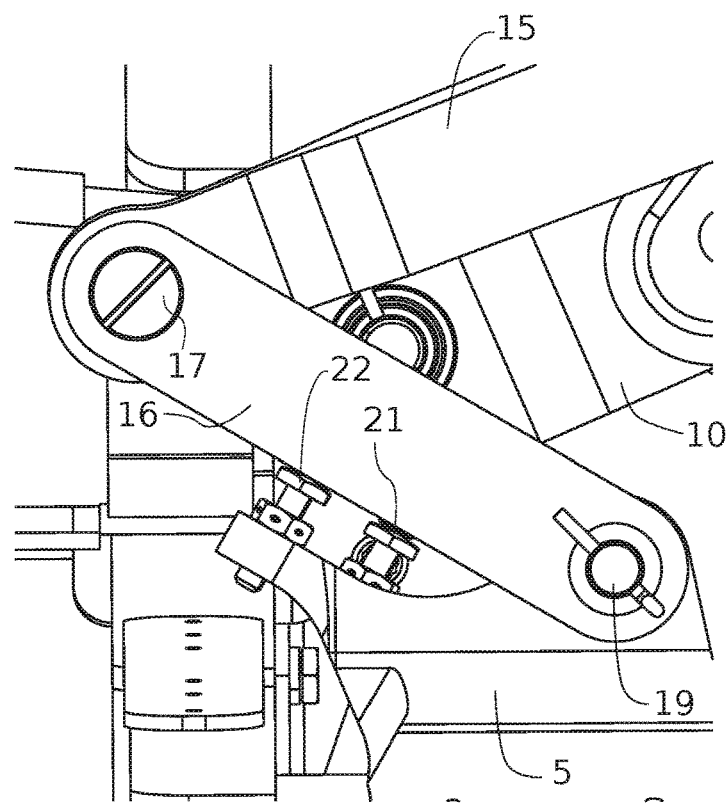
FIG. 15 is a bottom view of the elements of FIG. 13, in a second position.

FIGS. 14 and 15 are bottom views of FIG. 13 for two different positions.

FIG. 14 shows the elements of FIG. 13 when the door is in the locking/unlocking phase (corresponding to the schematic view of FIG. 8). FIG. 14 shows in particular the first stop 21 and the second stop 22, the third stop 23 being only partially visible.

FIG. 15 shows the elements of FIG. 13 when the door is in its unlocking position (corresponding to FIG. 5 and to the schematic view of FIG. 9), ready to be moved toward its open position of FIG. 6. The first forearm 11 is thus arranged against the first stop 21, the second forearm 16 is arranged against the second stop 22, and the third stop 23 is arranged against the first forearm 11.

Figure 16:
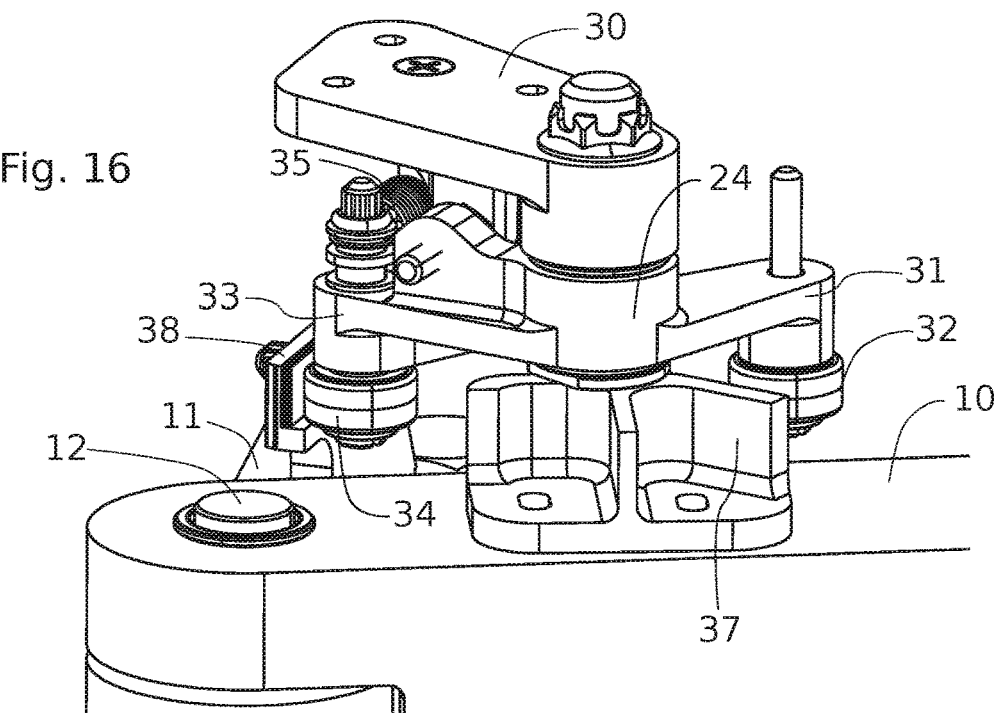
FIG. 16 is an enlarged view of the movable stop of the door of FIG. 7.

The movable stop 24 is mounted on a base secured to the leaf 5, mounted so as to be rotatable (with reference to FIG. 16).

Figure 17:
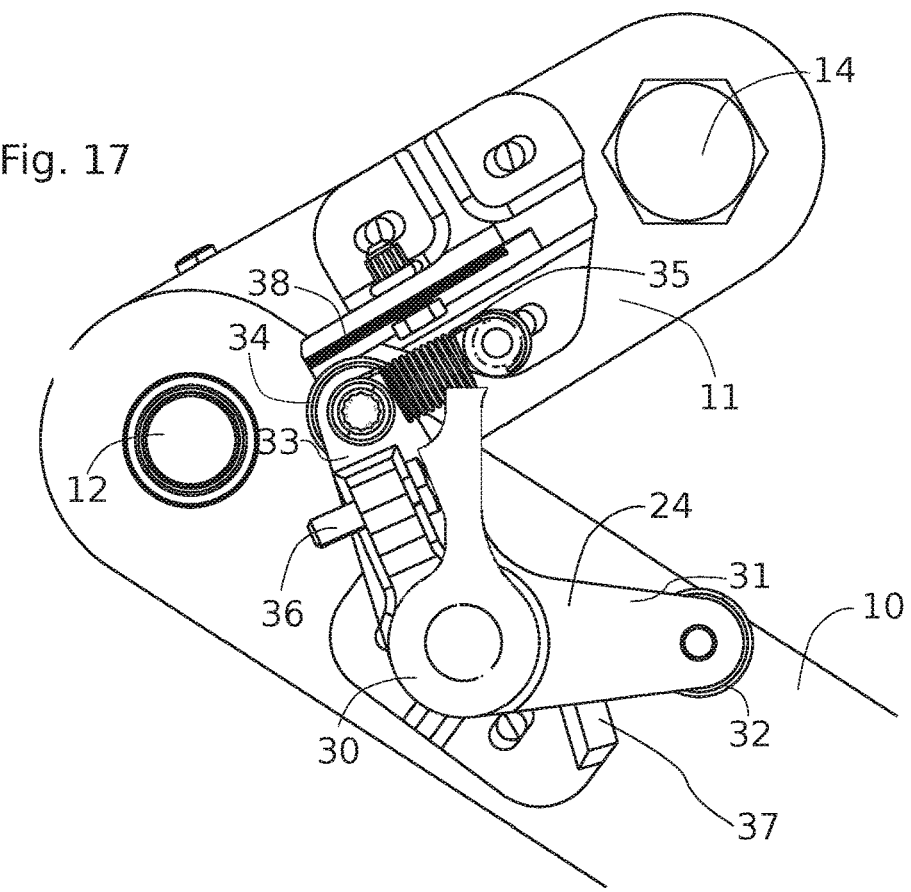
FIG. 17 is a top view of the elements of FIG. 13, in a first position.

FIG. 16 is an enlarged view of FIG. 13 showing the movable stop 24. FIG. 17 is a top view of FIG. 16. The movable stop 24 is rotatably mounted on the base 30 which is secured to the leaf 5, and comprises a first transverse arm 31 provided at its end with a contact element consisting here of a first roller 32, and a second transverse arm 33 provided at its end with a contact element consisting here of a second roller 34.

The movable stop 24 comprises an elastic return element consisting here of a spring 35 which urges the movable stop 24 toward a rest position in which an adjustable screw head 36 comes into contact with a stop surface of the base 30.

The movable stop 24 is adapted to cooperate, by its first arm 31, with a guide fitting 37 fixed to the first arm 10 and, by its second arm 33, with a stop surface 38 fixed to the first forearm 11. In the position of FIGS. 16 and 17, the movable stop 24 is in the activated position, the second roller 34 being arranged against the stop surface 38.

The immobilization of the first forearm 11 relative to the leaf 5 is carried out by the second roller 34 which is secured, in this activated position of the movable stop 24, to the leaf 5 via the base 30.

Figure 18:
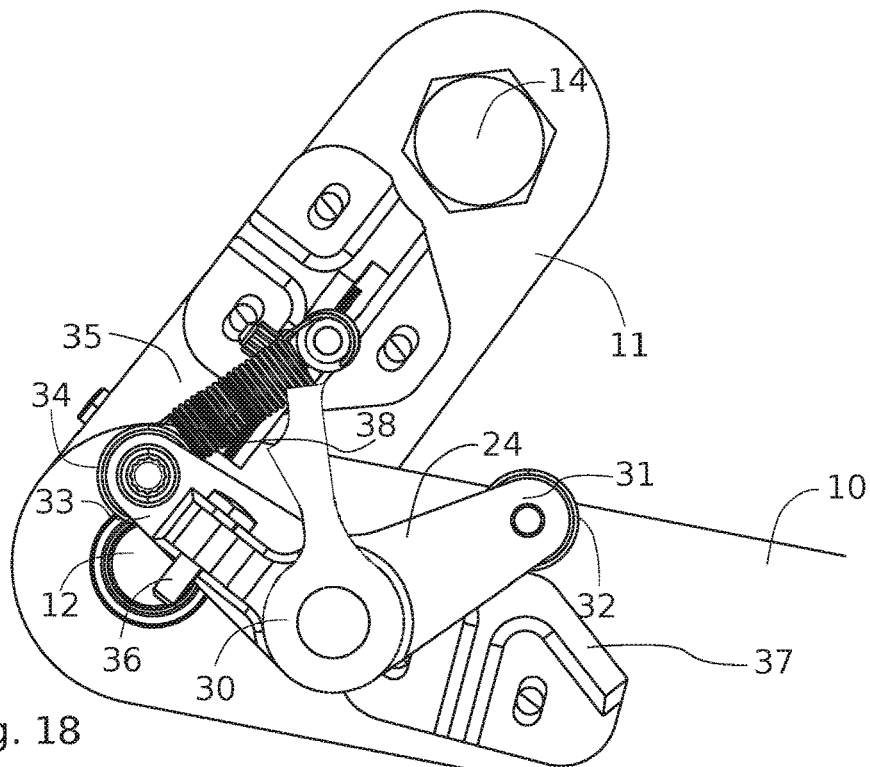
FIG. 18 is a top view of the elements of FIG. 13, in a second position.

FIG. 18 illustrates the position of the movable stop 24 when the door reaches its unlocking position. In this position, the second roller 34 escapes from the stop surface 38. The movable stop 24 is here designed to automatically pass into the deactivated position or into the activated position when approaching or leaving the unlocking position (corresponding to FIG. 6 and to FIG. 9). The location of the guide fitting 37 and the base 30 on the leaf 5 is chosen so that, when the door approaches its unlocking position, the guide fitting 37 pushes the first roller 32 back and causes the movable stop 24 to rotate against its return spring 35.

FIG. 18 illustrates the position of the movable stop 24 when the door is in its unlocking position. In this position, the second roller 34 escapes from the stop surface 38.

Figure 19:
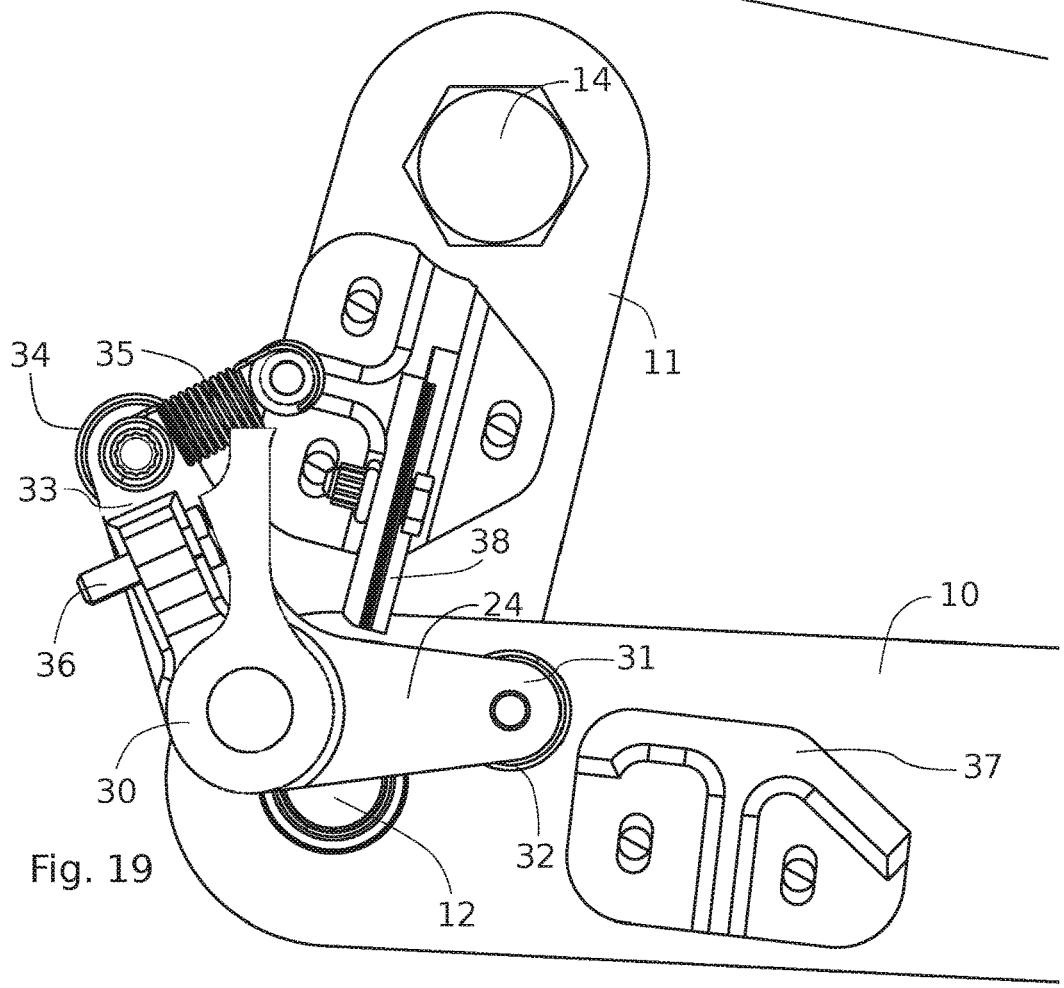
FIG. 19 is a top view of the elements of FIG. 13, in a third position.

From the position of FIG. 18, if a mutual pivoting movement between the first arm 10 and the first forearm 11 tends to open the angle that they form, the movable stop 24 then passes into its configuration shown in FIG. 19 in which the movable stop 24 is deactivated because the second roller 34 is outside the radius of action of the stop surface 38. This position corresponds to the phase of locking/unlocking the door and allows a free rotation of the first forearm 11 relative to the leaf 5. The first forearm 11 thus being free, the second forearm 16 is also free because it is then no longer urged against its stops.

Conversely, if from the unlocking position of FIG. 18 a mutual pivoting of the first arm 10 and the first forearm 11 tending to close the angle that they form, the stop then passes into the activated position corresponding to FIG. 17.

A door opening method therefore comprises a first unlocking phase in which the holding device is in the unlocking position, and a second opening phase in which the holding device is in the locking position, the holding device automatically passing into the locking position during the transition between the first phase and the second phase, at the time of the unlocking position. A door closing method takes place in an identical manner, in reverse order.

Variant embodiments of the aircraft door can be implemented without departing from the scope of the invention. For example, the position of the stops and the corresponding stop surfaces can be reversed. The first stop 21 can for example be fixed to the first forearm 11 and come into abutment against the leaf 5 during the unlocking position. The same goes for the other stops.

The leaf 5 can moreover be moved relative to one of the handling arms, or to both, by any device such as ramps, rollers, cams, guide track, etc.

The invention claimed is:

1. An aircraft door comprising:
   a leaf (5);
   a surround comprising a door frame (3) intended to be fixed to the fuselage of the aircraft;
   a door locking/unlocking device to move the leaf (5) relative to the door frame (3);
   a first handling arm (10) and a first forearm (11) interconnected by a first pivot connection (12), the first handling arm (10) being connected to the door frame (3) by a second pivot connection (13) and the first forearm (11) being connected to the leaf (5) by a third pivot connection (14);
   a second handling arm (15) and a second forearm (16) interconnected by a fourth pivot connection (17), the second handling arm (15) being connected to the door frame (3) by a fifth pivot connection (18) and the second forearm (16) being connected to the leaf (5) by a sixth pivot connection (19);
   a holding device, movable between: a locking position in which the first forearm (11) and the second forearm (16) are immobilized relative to the leaf (5); and an unlocking position in which the first forearm (11) and the second forearm (16) are free to pivot relative to the leaf (5) in at least one direction of rotation;
   wherein the holding device comprises a first stop (21) and a second stop (22) fixed to the leaf (50) and, when in contact with respectively the first forearm (11) and the second forearm (16), adapted to immobilize the rotation of the first forearm (11) and of the second forearm (16) relative to the leaf (5) in one direction of rotation;
   wherein the holding device comprises a third stop (23) adapted prevent the two forearms (11, 16) from coming together; and
   wherein the holding device comprises a movable stop (24) movable between; an activated position in which the movable stop (24) locks the position relative to the leaf (5) of one of the forearms against said first stop (21) if the forearm (11) is blocked and to the second stop (22) if the second forearm (16) is blocked; and a deactivated position in which the movable stop (24) locks directly to the first forearm (11) against the first stop (21) and locks indirectly to the second forearm (16) against the second stop (22) when the movable stop (24) is outside a radius of action of the first forearm (11).

2. The aircraft door as claimed in claim 1, wherein the locking/unlocking device comprises a moving device to move the first handling arm (10) and the leaf (5);
wherein the locking/unlocking device comprises a guide track (25) and an actuating finger (26), one of which is secured to the first handling arm (10) and the other of which is secured to the leaf (5), the path of the actuating finger (26) in the guide track (25) causing a relative movement of the first handling arm (10) and the leaf (5).

3. The aircraft door as claimed in claim 2, wherein the door is movable between:
a locking/unlocking configuration in which the holding device is in the unlocking position and the actuating finger (26) is captive to the guide track (25);
an opening configuration in which the holding device is in the locking position and the actuating finger (26) is released from the guide track (25).

4. The aircraft door as claimed in claim 3, further comprising door stops (7) and frame stops (4) adapted to laterally lock the leaf (5) on the door frame (3), the door being adapted to locking and unlocking by lateral movements of the leaf (5) relative to the door frame (3).

5. A method for opening an aircraft door as claimed in claim 1, the method comprising the steps of:
a first unlocking phase in which the holding device is in the unlocking position;
a second opening phase in which the holding device is in the locking position.

6. The method as claimed in claim 5, wherein between the unlocking phase and the opening phase, the leaf (5) passes through a predetermined position in which the holding device passes into the locking position by a return, a stop surface (38) is secured to the first forearm (11), a movable stop (24) adapted to cooperate by a first arm (31) with a guide fitting (37) secured to the first handling arm (10) and by a second arm (33) with the stop surface (38) fixed to a first forearm (11).

7. An aircraft door comprising:
a leaf (5);
a surround comprising a door frame (3) intended to be fixed to the fuselage of the aircraft;
a door locking/unlocking device to move the leaf (5) relative to the door frame (3);
a first handling arm (10) and a first forearm (11) interconnected by a first pivot connection (12), the first handling arm (10) being connected to the door frame (3) by a second pivot connection (13) and the first forearm (11) being connected to the leaf (5) by a third pivot connection (14);
a second handling arm (15) and a second forearm (16) interconnected by a fourth pivot connection (17), the second handling arm (15) being connected to the door frame (3) by a fifth pivot connection (18) and the second forearm (16) being connected to the leaf (5) by a sixth pivot connection (19);
a holding device, movable between: a locking position in which the first forearm (11) and the second forearm (16) are immobilized relative to the leaf (5); and an unlocking position in which the first forearm (11) and the second forearm (16) are free to pivot relative to the leaf (5) in at least one direction of rotation;
wherein the holding device comprises a first stop (21) and a second stop (22) adapted to immobilize the rotation of the first forearm (11) and of the second forearm (16) relative to the leaf (5) in one direction of rotation;
wherein the holding device comprises a third stop (23) adapted to prevent the two forearms (11, 16) from coming together;
wherein the holding device comprises a movable stop (24) movable between: an activated position in which the movable stop (24) locks the position relative to the leaf (5) of one of the forearms against said first stop (21) if the forearm (11) is blocked and to the second stop (22) if the second forearm (16) is blocked; and a deactivated position in which the movable stop (24) locks directly to the first forearm (11) against the first stop (21) and locks indirectly to the second forearm (16) against the second stop (22) when the movable stop (24) is outside a radius of action of the first forearm (11);
further comprising a predetermined position in which the first stop (21) is arranged between the leaf (5) and the first forearm (11), the second stop (22) is arranged between the leaf (5) and the second forearm (16), the third stop (23) is arranged between the first forearm (11) and the second forearm (16), and the movable stop (24) is in the activated position and arranged between the leaf (5) and the first forearm (11).

8. The aircraft door as claimed in claim 7, wherein the movable stop (24) is activated and deactivated by a guide fitting (37) arranged on the first handling arm (10), so that when the door is in said predetermined position, the movable stop (24):
is activated by a mutual rotation in one direction of rotation of the first handling arm (10) relative to the first forearm (11);
is deactivated by a mutual rotation in the other direction of rotation of the first handling arm (10) relative to the first forearm (11).

9. The aircraft door as claimed in claim 8, wherein the movable stop (24) is rotatably mounted on a base (30) secured to the leaf (5) and comprises a first arm (31) provided with a first contact element (32) and a second arm (33) provided with a second contact element (34), the second contact element (34) being arranged away from a stop surface (38) secured to the first forearm (11) when the first contact element (32) is moved by the guide fitting (37).

10. The aircraft door as claimed in claim 9, wherein the movable stop (24) comprises an elastic return element (35) urging the movable stop (24) toward a resting position against the base (30).

* * * * *